US011675793B2

(12) United States Patent
Drivflaadt et al.

(10) Patent No.: US 11,675,793 B2
(45) Date of Patent: Jun. 13, 2023

(54) SYSTEM FOR MANAGING, ANALYZING, NAVIGATING OR SEARCHING OF DATA INFORMATION ACROSS ONE OR MORE SOURCES WITHIN A COMPUTER OR A COMPUTER NETWORK, WITHOUT COPYING, MOVING OR MANIPULATING THE SOURCE OR THE DATA INFORMATION STORED IN THE SOURCE

(71) Applicant: INTELLIGENT OPERATIONS AS, Stavanger (NO)

(72) Inventors: Øystein Drivflaadt, Stavanger (NO); Stein Fredriksen, Stavanger (NO)

(73) Assignee: Intelligent Operations AS, Stavanger (NO)

( * ) Notice: Subject to any disclaimer, the term of this patent is extended or adjusted under 35 U.S.C. 154(b) by 172 days.

(21) Appl. No.: 16/347,058

(22) PCT Filed: Nov. 2, 2017

(86) PCT No.: PCT/EP2017/078100
§ 371 (c)(1),
(2) Date: May 2, 2019

(87) PCT Pub. No.: WO2018/083199
PCT Pub. Date: May 11, 2018

(65) Prior Publication Data
US 2020/0073871 A1 Mar. 5, 2020

(30) Foreign Application Priority Data
Nov. 2, 2016 (NO) .................................. 20161737

(51) Int. Cl.
*G06F 17/00* (2019.01)
*G06F 16/2457* (2019.01)
(Continued)

(52) U.S. Cl.
CPC ...... *G06F 16/24575* (2019.01); *G06F 16/254* (2019.01); *G06F 16/285* (2019.01)

(58) Field of Classification Search
CPC ............ G06F 16/24575; G06F 16/285; G06F 16/254; G06F 16/367; G06F 16/36;
(Continued)

(56) References Cited

U.S. PATENT DOCUMENTS 8,751,437 B2 * 6/2014 Teichmann ............. G06F 16/28
707/600
9,535,963 B1 * 1/2017 Shankar .............. G06F 16/2433
(Continued)

OTHER PUBLICATIONS

International Search Report and Written Opinion dated Sep. 24, 2018, for corresponding International Application No. PCT/EP2017/078100; International Filing Date: Nov. 2, 2017 consisting of 10-pages.
(Continued)

*Primary Examiner* — Greta L Robinson
(74) *Attorney, Agent, or Firm* — Christopher & Weisberg, P.A.

(57) ABSTRACT

The inventions and its embodiments (hereafter called "the System") are intended for use by any user in any situation where the amount of data is too extensive to effectively make sense of it in traditional manners or by use of traditional technology. Source data may be provided by one or many network computers and their inherent applications and/or data repositories. Information is made available to the users in intuitive contexts without moving, copying or manipulating the source data. Raw source data is extracted, analyzed, improved and normalized through a curating process for use by the System. All metadata are connected through a multidimensional, non-linear relational network, the fixed layer, based on a persistent relational network that
(Continued)

includes any existing or emerging contextual information in the form of structured metadata.

7 Claims, 13 Drawing Sheets

(51) Int. Cl.
*G06F 16/28* (2019.01)
*G06F 16/25* (2019.01)

(58) Field of Classification Search
CPC .... G06F 16/48; G06F 16/24573; G06F 16/38; G06F 16/35; G06F 16/211; G06N 3/04
See application file for complete search history.

(56) References Cited

U.S. PATENT DOCUMENTS

| | | |
|---|---|---|
| 2006/0053382 A1 | 3/2006 | Gardner et al. |
| 2013/0325757 A1 | 12/2013 | Heidasch |
| 2013/0325770 A1* | 12/2013 | Heidasch ............ G06N 3/0427 706/20 |
| 2016/0012122 A1 | 1/2016 | Franceschini et al. |
| 2016/0224645 A1 | 8/2016 | Dang |
| 2016/0283589 A1 | 9/2016 | Bostick et al. |
| 2017/0004129 A1 | 1/2017 | Shalaby et al. |
| 2017/0193179 A1* | 7/2017 | Donovan ............... G16H 40/63 |
| 2017/0330106 A1* | 11/2017 | Lindsley ............... G06F 16/367 |
| 2020/0073871 A1* | 3/2020 | Drivflaadt ............. G06F 16/285 |

OTHER PUBLICATIONS

Dawnseeker2000 et al: "Extract, transform, load", Wikipedia, the free encyclopedia; pp. 1-9 ; XP055321721, Retrieved from the Internet; URL:https://en.wikipedia.org/w/index.php?title=Extract,_ transform,_load&oldid=671485155; dated Jul. 15, 2015; Consisting of 10 pages.

International Search Report dated May 18, 2017, for corresponding International Application No. 20161737; International Filing Date: Nov. 2, 2016 consisting of 2-pages.

* cited by examiner

Main Flow Diagram, Complete View

Main Flow Diagram, Partial View - Connector and Persistent Metadata Store

Main Flow Diagram, Partial View - Mapper and Relational Network

Main Flow Diagram,
Partial View,
Intelligence and
Front End

Network Diagram

Relationship Exporter

Fixed layer example

Fixed Layer Example, Partial view

Relational Network
internal relationships,
Document example

FIG. 7 Relationships and Termsets Example

Termsets Example

Termsets Example

SYSTEM FOR MANAGING, ANALYZING, NAVIGATING OR SEARCHING OF DATA INFORMATION ACROSS ONE OR MORE SOURCES WITHIN A COMPUTER OR A COMPUTER NETWORK, WITHOUT COPYING, MOVING OR MANIPULATING THE SOURCE OR THE DATA INFORMATION STORED IN THE SOURCE

CROSS-REFERENCE TO RELATED APPLICATIONS

This application is a Submission Under 35 U.S.C. § 371 for U.S. National Stage Patent Application of International Application No.: PCT/EP2017/078100, filed Nov. 2, 2017 entitled "A SYSTEM FOR MANAGING, ANALYZING, NAVIGATING OR SEARCHING OF DATA INFORMATION ACROSS ONE OR MORE SOURCES WITHIN A COMPUTER OR A COMPUTER NETWORK, WITHOUT COPYING, MOVING OR MANIPULATING THE SOURCE OR THE DATA INFORMATION STORED IN THE SOURCE," which claims priority to Norwegian Application Number 20161737, filed Nov. 2, 2016, the entireties of all of which are incorporated herein by reference.

INFORMATION ABOUT PRIOR APPLICATIONS OR PATENTS

Intelligent Operations has not filed other patent claims aside from the claim that is listed as priority claim, filed in Norway.

Technical Field

The System is intended for use in management, analysis, governance, navigation, search and/or collaboration of information across any or all sources found within a computer or a computer network. The invention and its embodiments will enable any single user to access any or all information in a computer or a computer network in a contextual manner based on intuitive and well-known navigation structures in a computer client. The System may be used in this form to connect to any source or sources, including any type of information, data or records.

BACKGROUND

Prior Art

The most common technology in use today to make large amounts of information available, is search technology.

Search technology makes the information searchable by creating indexes from the full text of the information source. The user must actively choose a strategy for the search, and a term or more to include in the search. The result is then presented based on how the different search engines rate the hits in the total mass of results. The result will always depend on how intelligent the search is, that the term the user searches for is the term that is used in all the results the user may need, and how well the user is able to twist the search terms to better hit something useful. The rating may be based on many criteria, including complete or near-complete matches with the search terms, and will not always correspond to what the user expects or needs. In addition, since search technologies depend on indexing of the source data to make it searchable, it is not the entire selection of data and all its details that is searched, but the index of the data. This index may be generated in several ways, using different types of technologies, but will still always only be a selected representation of the original data, and more or less useful depending on the user needs. Search technology has grown from and with the growth of internet technology, and has its main use in this sphere. In addition, attempts are being made to utilize the same technology on files, records and documents in "enterprise search" technologies. They still depend on one or more indices and present results based on these in more or less ordered lists.

The solutions that are part of the invention does not depend on indexing or the full text to make information available. All information has metadata of varying types, amounts and quality. The solution uses metadata to structure the information, both the original metadata and a structure of deep relational metadata in the Fixed Layer. Full text is also used, but then without the disturbing process of indexing. The system uses other technologies and structures to make information from the full text available to the solution.

SUMMARY

The invention is a system for managing, analyzing, navigating or searching of data information across one or more sources within a computer or a computer network, without copying, moving or manipulating the source or the data information stored in the source. The System enables a user to access the data information in a contextual manner based on metadata extraction of the data information and entity relations. The metadata is connected to a fixed layer adjusted to create a fixed relational structure of entities, entity types, entity relations and entity relation types defining internal relationships, placing each data information element in an intuitive and categorizing context. The system includes a mapper that selects and structures the metadata, a metadata curator adjusted to process the metadata according to a set of rules and criteria, and a relationship creator that creates relational network clusters based on the processed metadata from the metadata curator and connector. The mapper is further adjusted to parse and map the relational network cluster with the fixed relational structure, creating a relational network with relationships between the metadata and fixed layer entities.

Within the System, the respective relationships between the metadata and fixed layer entities have properties like: relationship type, terms, weight/probability and information about what type of fixed layer entity it is connected to. The fixed layer includes relationships and metadata classes, sub-classes and identifiers. To further classify the data information, the System also has a set of criteria that includes trustworthiness, time, quality and usefulness.

To make the mass of metadata from the sources useful to the System, the metadata curator is further adjusted to add, remove, parse or combine metadata to provide a more effective metadata structure.

For the end user, the relational network enables metadata from one or more sources to be aligned and connected, providing the user with structured and navigable access to the data information in a contextual manner, with no need for searching.

The relational network also provides the user with access to the information through multipoint pivoting so that the user is enable to navigate in the information through any path and then pivot around any class or sub-class to restructure the result.

The fixed layer internal relationships and metadata includes, but are not limited to, metadata that are organizational, legal, structural, geographical and/or time relationships.

The system analyzes the data information like files and/or documents, whether these are stored in one or more sources, or one or more databases.

This enables the end user to find any piece of information within a context across all general or proprietary data stores, which in turn transforms the unstructured data or information to structured information and even knowledge put into system. The higher purpose is to make big data available to all end users without having to migrate or copy the data, and without the need for costly and time-consuming implementation projects, and without challenging existing security and governance procedures or rules.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

1. Source (FIG. 1, 1A, 1B, 1C)

The Source (1) may be any digital repository of data in any way, shape or form or format (i.e. in a database, application, fileserver or other). This will contain the files or data that is used in its initial and native form. Example: Documents stored in a Document Management Solution for the purpose of keeping them safe and manageable or files and data used in a finance system for project accounting. A Source may also initially be paper documents that needs to be scanned. These scanned documents will then be treated the same as original, electronic documents.

2. Source API (FIG. 1, 1A, 1B, 1C)

The Source API (2) may be any digital interface that is available for the native source (2). Our invention is connected to the Source via this standard interface.

3. Connector (FIG. 1, 1A, 1B, 1C)

The Connector (3) is a method and system for connecting to the Source API to obtain metadata and data from the Source (1) without moving, copying or changing the data or files in the Source (1) or changing the Source API (3) to do so. Another main function of the Connector is to ensure the security and integrity of the information. Files, data and documents will retain the same security levels as in the Source (1), thus ensuring that user only gain access to data they already have access to. This will also enable single sign on (SSO).

4. Metadata Extractor (FIG. 1, 1A, 1B, 1C)

The Metadata Extractor (4) is a method and system for extracting the metadata from the files or data in a Source (1) without moving, changing or copying the files or data. The metadata is stored in the Persistent Metadata Store (8). The metadata is extracted from both the files or data and the system (Source (1)) they are stored in. The Metadata Extractor extracts all metadata available.

5. Data extractor (FIG. 1, 1A, 1B, 1C)

The Data extractor (5) contains functions that read and extract data from files that are editable and/or in original formats. The data is stored as raw data and exported to the Data cache, thus making the text and/or data in files available as data to the System.

6. File reader (FIG. 1, 1A, 1B, 1C)

The File reader (6) contains functions that read, recognizes and lifts data from files that are stored in not editable formats such as images, scans and/or PDFs. The data is then transported to the Data extractor and follows the same path as other data thereafter.

7. File image generator (FIG. 1, 1A, 1B, 1C)

The File image generator (7) generates and stores an image of the front page of all documents for future reference, and for the user to better understand the full context of the document, —in the System.

Figure 1:
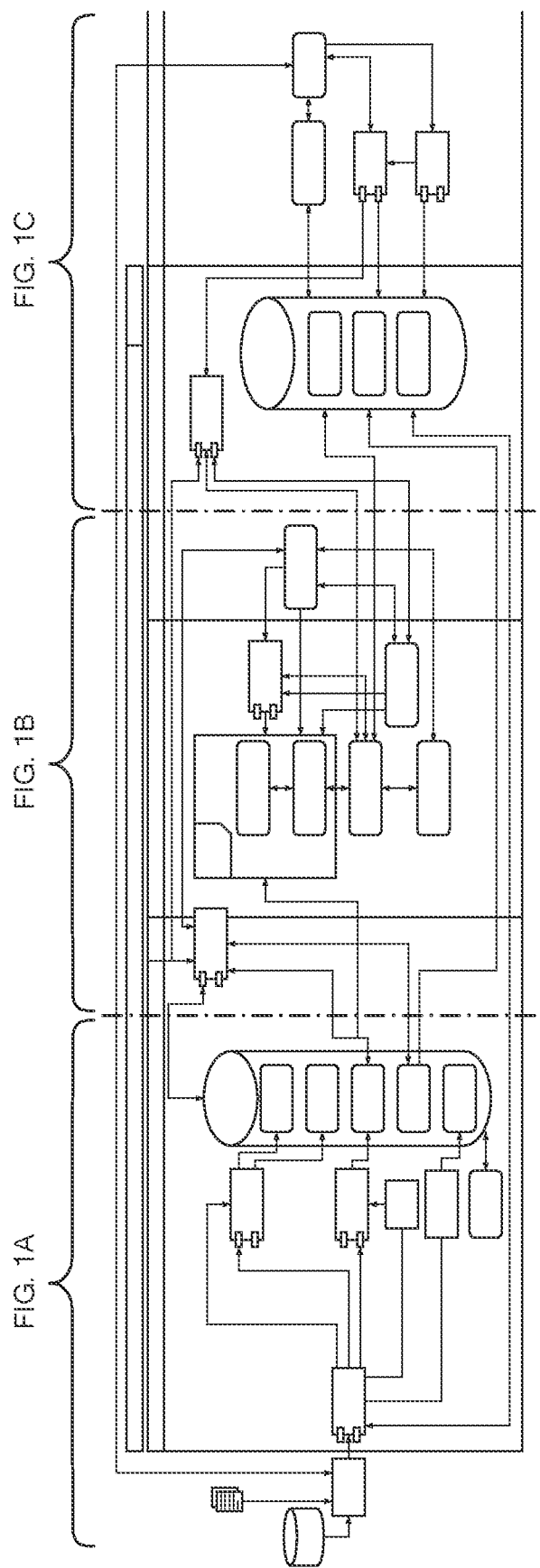

8. Persistent Metadata Store (FIG. 1, 1A, 1B, 1C), 8.1. Source metadata (FIG. 1, 8a), File metadata (FIG. 1, 8b), Data cache (FIG. 1, 8c), Text tags (FIG. 1, 8d), Thumbnails (FIG. 1, 8e). The Thumbnails (8e) are generated images of the files and/or documents in their original form and The Persistent Metadata Store (8) is one of three persistent modules in the system, making the system polyglot persistent in the true meaning of the term. The Persistent Metadata Store contains all metadata from the sources (applications, databases and/or file systems) and from the files themselves in raw and untreated formats.

All Source metadata (8a) is stored as input to the System. The Metadata Extractor (4) is able to extract all metadata available in the Source for each file. This will differ slightly from and overlap the File Metadata (8b). The Source metadata is structured for the use of the source application or database, and as such will quite often be more structured and reliable than the File Metadata. There are unique IDs that are generated by the Source (1) that pass through the System unchanged for reference and integrity.

File metadata (8b) is stored as input to the System. File metadata lives on and for the file itself, and will quite often be influence by several Sources (1) throughout its lifecycle. In some instances, some of the File metadata will be more reliable, albeit less structured, than the Source Metadata (8a).

The Data cache (8c) is data from the files. At this point, the System has transformed the information previously only available when one opened a file, to raw data available to the System and its processes and intelligence. This, together with the metadata (8a & b), is of vital importance to the System and one of the unique traits of the System. From the Data cache, the system will also extract a summary of the contents of the file, record or document to be stored together with the metadata for reference.

The Text tags (8d) is the only part of the Persistent Metadata Store (8) that is not generated in the original Source (1). The Text tags are submitted by the Text tag generator (9), which in turn has extracted the Text tags from the data in the format in the Source (1). This is stored for reference and use later in the System.

Data cache (8c). For more on this, see Text tag generator. Metadata Analytics (FIG. 1, 1A, 1B, 1C)

The Metadata Analytics module (8f) enables analysis of all metadata for any file, record or document. This is all the raw metadata available from the Source (1) repository before it enters the intelligence of the System.

9. Text tag generator (FIG. 1, 1A, 1B, 1C)

The Text tag generator (9) generates keywords from the Data cache (8c) for use in the System. The Text tag generator works based on teaching rules and learning by itself, generating only the meaningful terms from each file, record or document. The Text tags (8d) enhance the metadata and adds context and subject matter insight. The Text tag Generator generates both text tags based on the simple content the data information, and text tags based on contextual input to ensure complex or unique terms from the context where the data was generated or authored are added to the Text Tags. The Text tags are ranked based on prevalence in the specific file, record or document and in the total corpus of terms in the sources spanned by the System. The Text tag generator also uses input from other modules in the System, such as the Fixed layer (13), the Metadata Repository (14), the Teaching Module (15), the Learning Module (16) to learn from the System and the users, and further optimize the generation of Text tags in a continuous self-improving cycle.

10. IntOp Mapper (FIG. 1, 1A, 1B, 1C) 10.1. Metadata curation (FIG. 1, 10*a*)

Relationship Exporter (FIG. 1, 1A, 1B, 1C)

The IntOp Mapper (10) is a key module of the System, and at the heart of the functionality and method of the System.

The IntOp Mapper contains functions that selects and improves the quality and structure of metadata from the Persistent Metadata Store (8), converts the files, records and documents with related curated metadata to relational networks and adds multiple functional relationship of several types and with several properties to the Fixed layer (13) relational network.

In the Metadata curation module (10*a*), the Metadata (8*a* & *b*) and the Text Tags (8*d*) are handled based on rules. The raw metadata is sorted and selected based on criteria such as trustworthiness, time, quality and usefulness. In addition, the curator process may add or remove, parse or combine metadata to give a more effective metadata structure for each file.

The IntOp Mapper (10) will export the file and relationships to the Fixed layer (13) as a relational network cluster. The relationships between the metadata and the Fixed layer will have properties that gives the System input about relationship type, terms, weight/probability and what type of Fixed layer instance it connects to. The Relationship Exporter (10*b*) generates the Relational Network (11) as a whole, based on the rules that are identified. The Relational Network is almost a dynamic, organic structure and will be influenced by the sources, contexts and user patterns of the organization it is implemented at.

11. Relational Network (FIG. 1, 1A, 1B, 1C)

The Relational Network (11) is the product of all functions 3-10, with the added intelligence from the Fixed layer (13), Metadata Repository (14) and the Teaching Module (15). This is the intelligence and logic of the System where all relationships and metadata are stored in full complexity.

12. Analytics (FIG. 1, 1A, 1B, 1C)

The Analytics module (12) gives developers or users the possibility of analyzing the Relational Network (11) to gain insights into how the System has structured the files, documents or records from the Sources (1), and to find relationships or paths between groups of data or metadata. Using the Analytics module, a user can give developers insights into how well the System is performing, and developers may teach the System new procedures based on this, in turn improving the Systems overall performance and intelligence.

13. Fixed layer (FIG. 1, 1A, 1B, 1C)

The Fixed layer (13) is another unique and central part of the System that could be described as a fixed relational structure built from metadata and metadata about metadata with internal relationships. The Fixed layer contains metadata classes, sub-classes and identifiers that all metadata from Sources (1) may be connected to through the IntOp Mapper (10). Through this connection, the unstructured, heterogenic metadata from the different Sources will be aligned and connected, giving the end user a homogenous metadata structure to navigate. The Fixed Layer also replaces most of the functions in a traditional extract-transform-load process with a much more effective and non-linear process, leaving the source data untouched. The Fixed layer's categorizing and relational structure enables "multipoint pivoting" across the categories or classes, so the end user may navigate data through any path and then pivot around any class or sub-class to restructure the result.

14. Metadata Repository (FIG. 1, 1A, 1B, 1C)

The Metadata Repository (14) contains the metadata and metadata about metadata for the System. It also contains taxonomic or ontological structures. In addition, it enables the generation of relational bindings through advanced term sets and semantic structures, for any context, process or activity in an organization. The Metadata Repository is also managed and improved both by the system, through advanced learning, and by the system admin or developers through teaching.

15. Teaching Module (FIG. 1, 1A, 1B, 1C)

The Teaching Module (15) contains functions that enable the developers or system admins to teach the System new procedures. The Teaching Module stores all of the procedures it has been taught through its lifecycle. The procedures contain rules and regulations of how relationships are generated, what types of relationships may exist, what properties they have, and how each individual relationship is weighted.

16. Learning Module (FIG. 1, 1A, 1B, 1C)

The Learning Module (FIG. 1, 1A, 1B, 1C) contains functions that gathers and analyzes statistics, user patterns, Relational Network (11) data and logs, and learns from these. The learning may take several forms and give several types of results. The Learning Module may suggest new Text Tags (FIG. 1, 8*d*) to improve the contexts of the documents in the Relational Network. It could also increase accuracy of user navigation by weighting the files according to how often they appear in results. In short, the Learning Module will take any data or metadata about the system and through a combination of unassisted and assisted learning improve the functionality of the System.

17. Persistent Relationship Store (FIG. 1, 1A, 1B, 1C) 17.1. Relationships (FIG. 1, 17*a*). Contexts (FIG. 1, 17*b*). Navigation (FIG. 1, 17*c*) The Persistent Relationship Store (FIG. 1, 17) is the product of the System, and the source of stabile data and metadata for the API and front ends. In this persistent layer, the complete and persistent results of the last run of the previous steps in the System is stored. All relationships, contextual metadata, extracted and curated source metadata and navigation metadata are stored here to make this available to end users. The following relationship-related information may be stored in the Persistent Relationship Store:

At any given time, a multitude of relationships are available in the Relational Network (FIG. 1, 11). Not all of these will be made available to the end user for navigation purposes. The relationships that are exported to the Persistent Relationship Store (17) are the functional and useful relationships that an end user or user group requires to navigate data in the context(s) they are working in.

Contexts (FIG. 1, 1A, 1B, 1C) are clusters in the Relational Network (11) that by their Relationships (17*a*) constitutes a context. Some of the logic and contextual metadata is generated through the Fixed layer (13) and some of it is generated through the sum of the logic and intelligence in the System. The Contexts are central to the way metadata and data are treated and made available to the end users in the System. A Context may be viewed as the sum of all relationships within any given area of information.

To make the data in the Persistent Relationship Store (FIG. 1, 17) available to end users, a set of navigation metadata is made available to the Dispatch Module and the front ends. These navigation metadata may be in another language than the majority of the Systems metadata, or they may be more aligned towards the terminology the end users are accustomed to in the contexts they are working in.

18. Dispatch Module (FIG. 1, 1A, 1B, 1C)

The Dispatch Module delivers JSON or XML content to the front end via a RESTful API. It enables the System to be fully working with any existing or fit for purpose front end.

19. Logging (FIG. 1, 1A, 1B, 1C)

The Logging Module logs all activity in the Front End (21) and communicates this in raw form to the Learning Module (FIG. 1, 16). Logs will contain anonymous statistics about general user activity. It will also contain specialized statistics about trends across user groups. Above all, it will contain structured logs about how documents are presented in results and how and when this happens.

20. Search (FIG. 1, 1A, 1B, 1C)

The Search Module contains functionality for searching the results of a filtered context in the Front End (FIG. 1, 21). The module may contain both be traditional full text search and a Key Word Lookup based on the Text tags (FIG. 1, 8d) supplied by the Text Tag generator (FIG. 1, 9), where the Key Word Lookup function will be the most powerful function.

21. Front End (FIG. 1, 1A, 1B, 1C)

The Front End presents contents of the Sources (FIG. 1, 1A, 1B, 1C, 1) in intuitive contexts and enables navigation of these based on interactive filters and facets.

Figure 2:
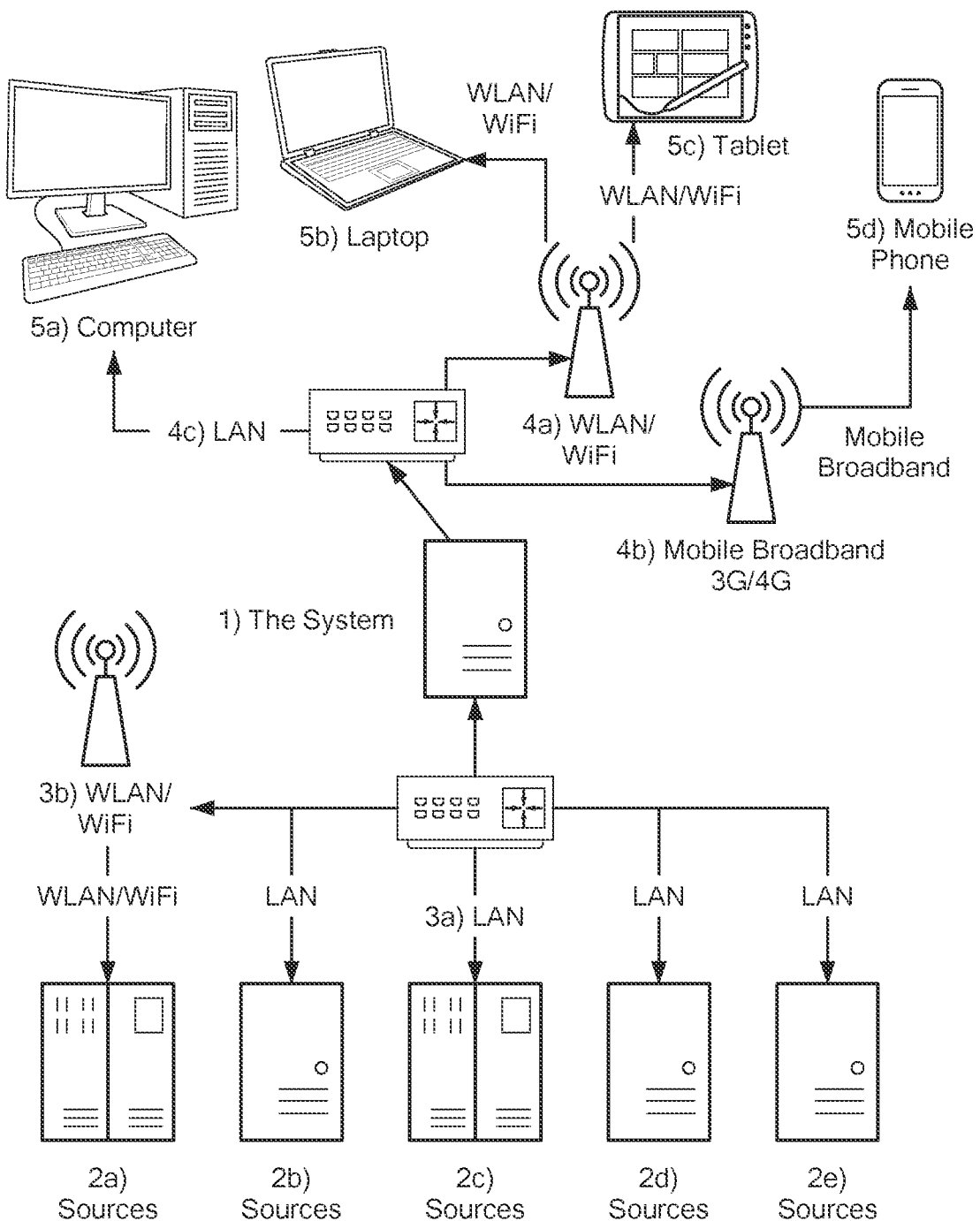

FIG. 2, Network Diagram

22. The drawing illustrates how the System (FIG. 2, 1) communicates over LAN (FIG. 2, 3a) or WLAN/WiFi (FIG. 2, 3b) with other network computers as Sources (FIG. 2, 2a-d) and makes information available to users via different types of client network computers (FIGS. 2, 5a & b), tablets (FIG. 2, 5c) or mobile phones (FIG. 2, 5d) communicating via WLAN, mobile broadband or LAN (FIG. 2, respectively 4a, b and c). The System may be connected to any number of Sources and clients at any given time, and users of the clients will access the System via the Front End (FIG. 1, 21).

FIG. 3, Curator

Figure 3:
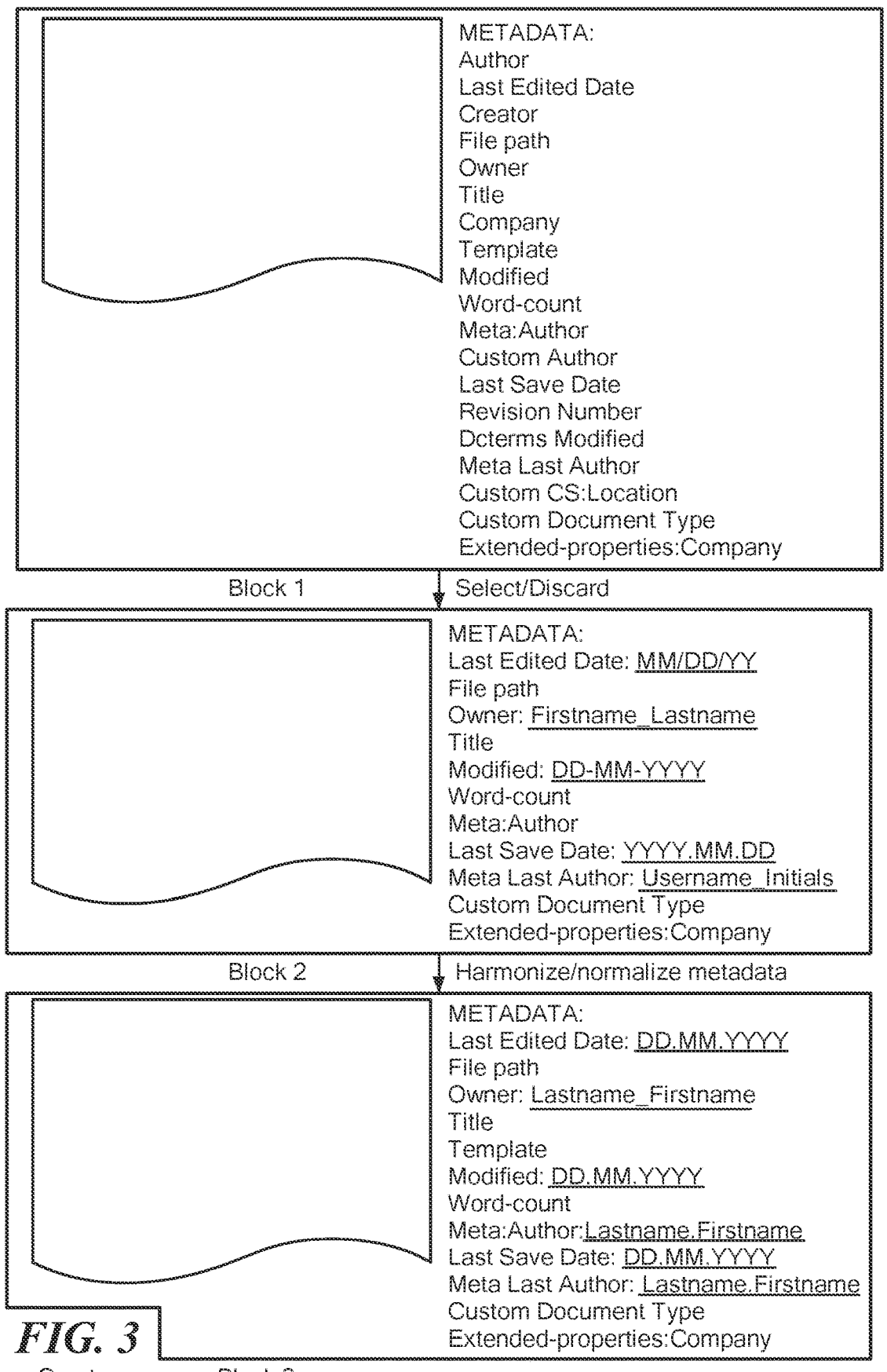

23. The drawing illustrates the process of extracting and refining metadata in the System. This is illustrated with FIG. 3 Block 1-3 where metadata is initially delivered (FIG. 1, 10a) from the Connector (FIG. 1, 3) has delivered all metadata from the Source (FIG. 1, 1) to the Persistent Metadata Store (FIG. 1, 8), and the Metadata curation unit (FIG. 1, 10a) has refined and improved the metadata. FIG. 3 Block 1 illustrates a set of metadata from Source. Most often, the volume of metadata is large, so this example is scaled down for clarity. In FIG. 3 Block 1, the metadata is still in its original state like it would be when extracted from the Source and stored in the Persistent Metadata Store (8). In FIG. 3 Block 2, the System has respectively selected and discarded metadata, leaving a selected set of metadata that is deemed by the System to be the most useful and trustworthy metadata from that particular Source. In FIG. 3 Block 3, the Metadata Curation unit in the System has performed a harmonization and normalization of metadata, indicated by the alignment of syntax in dates and names, leading to all dates and names being the same format regardless of the initial syntax in the Source.

Figure 4:
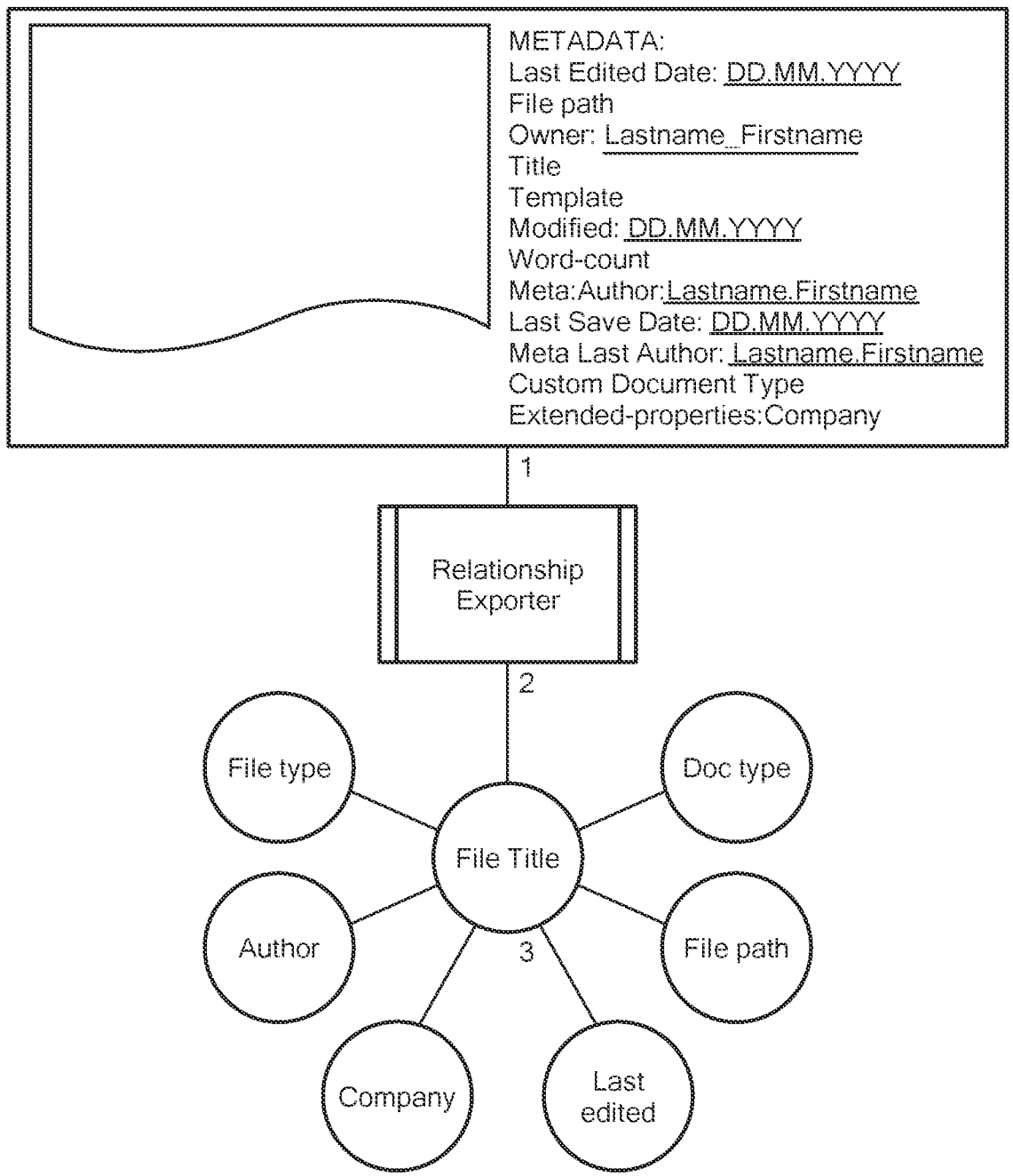

FIG. 4, Relationship Exporter

24. The drawing illustrates the function of the Relationship Exporter (FIG. 1, 10b) in the IntOp Mapper (FIG. 1, 10). The Relationship Exporter is presented with the refined metadata (FIG. 4, 1) from the Metadata curation unit (FIG. 1, 10a and FIG. 3, Block 3). The metadata is transformed by the functions in the Relationship Exporter (FIG. 4, 2) from linear metadata to an initial relational network cluster (FIG. 4, 3) where the metadata is represented as separate entities with relationships to the file entity. In at least one configuration of the System, the relationships will have properties. In at least one configuration of the System, the metadata entities will have additional properties to the metadata value or class. In at least one configuration of the System, the Relationship Exporter will also export Text tags (FIG. 1, 8d) generated by the Text tag generator (FIG. 1, 9). These will be represented as separate entities with properties identifying the entities as Text tags.

Figure 5:
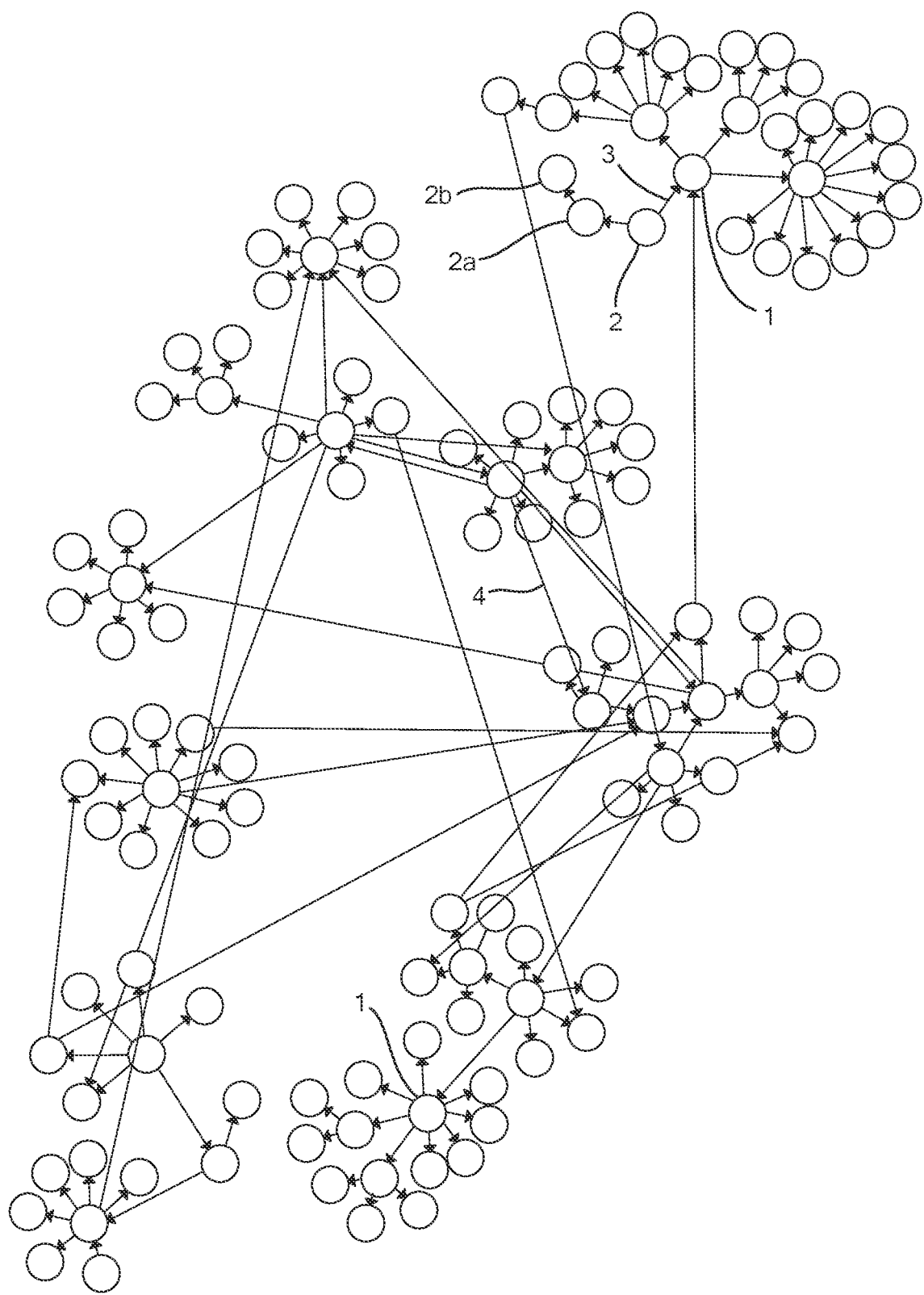
Figure 5A:
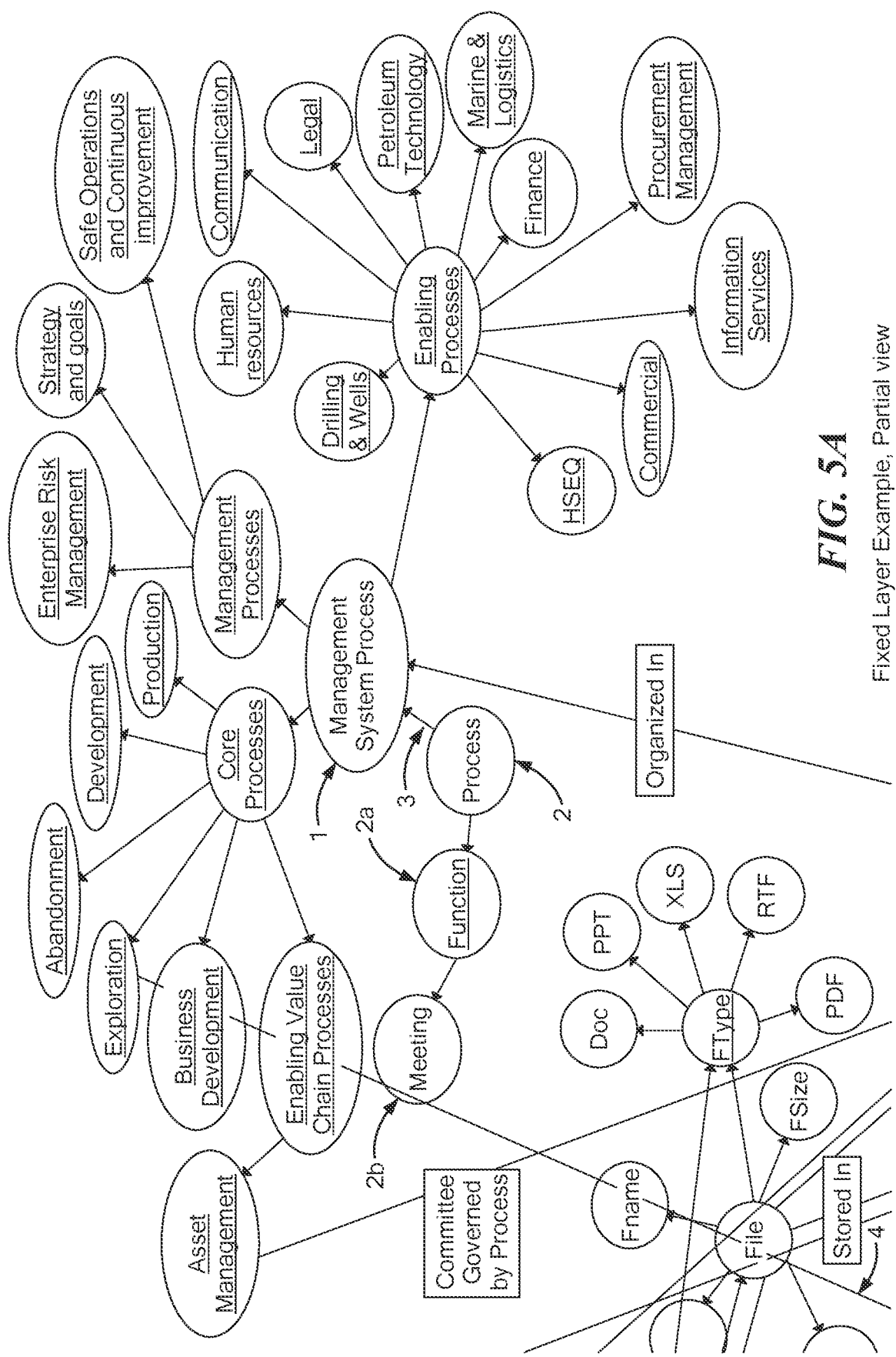

FIG. 5, 5A, Fixed Layer Example

25. The drawing (FIG. 5) illustrates a simple example of the Fixed layer (FIG. 1, 13). In most configurations of the System, the Fixed layer will be more complex than this example, which has been simplified for clarity. See FIG. 5-a for a partial view that where example entities are more legible. The Fixed layer is a multi-relational, nonlinear, neural complex relational network of metadata entities. In at least one configuration of the System, the Fixed layer will contain a metadata structures that are hierarchical and/or taxonomic and/or ontological and/or has a fit for purpose order and structure. In at least one configuration of the System, the metadata structures will have a tree-like order for certain metadata structures. This will contain a top class or root (FIG. 5, 1) with tree-internal relationships (FIG. 5, 3) to one or many branches that contain one or more children (FIG. 5, 2) and siblings (FIG. 5, 2a) which again will have leaves (FIG. 5, 2b). The Fixed layer may contain every metadata entity needed to create relationships to the metadata of files, records and documents for an organization or corporation. The different metadata entities (FIG. 5, 1) and their internal structure may have intra-Fixed layer relationships (FIG. 5, 4) that creates a further meta structure between entities that would have otherwise only be related to its own structure. In FIG. 5, the examples show how Exploration as a sub-entity and leaf in the Management System Processes taxonomy structure has a relationship to EXP-Exploration as a sub-entity and leaf, part of the Hierarchy organizational taxonomy.

Figure 6:
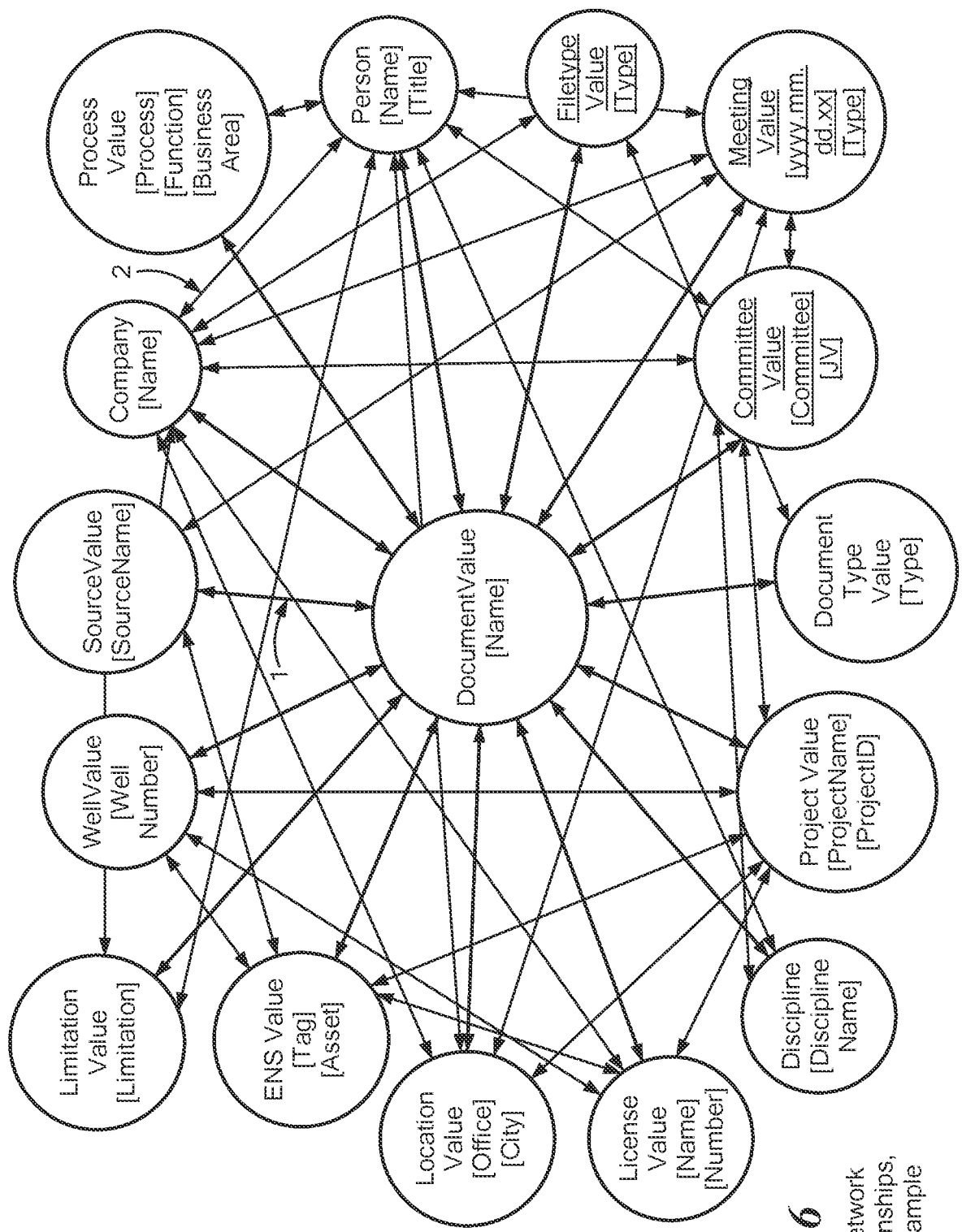

FIG. 6, Relational Network internal relationships, Document example

Figure 7:
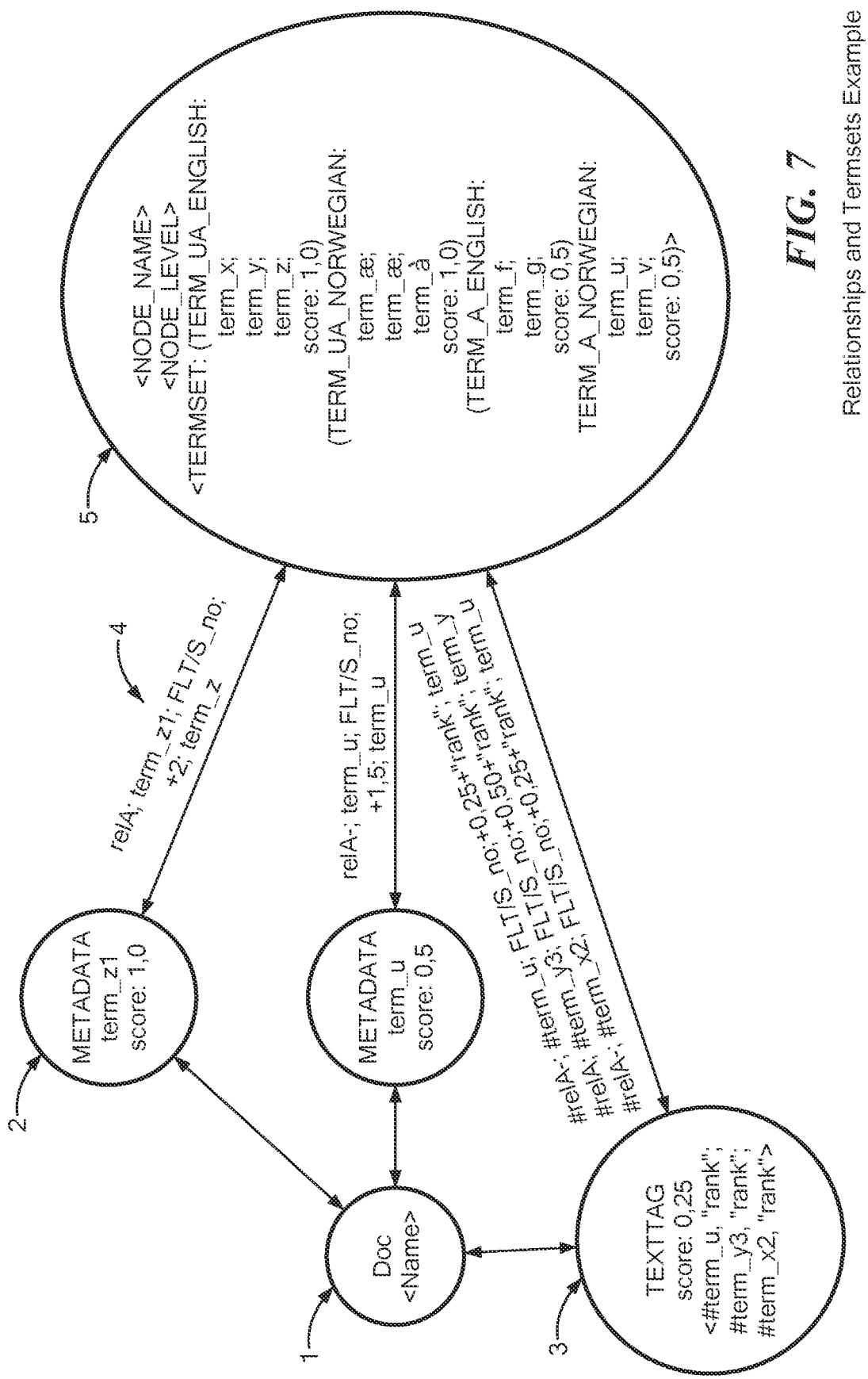

26. The drawing (FIG. 6) illustrates the Relational Network, and focuses on relationships between the Fixed layer (FIG. 5 and FIG. 1, 13), and an initial relationship cluster, with the example of a document entity. It shows the DocumentValue entity at the center of the fixed layer multi-relational non-linear network, and displays an example of which metadata entities that may be related to a document entity. In this simplified example, Fixed layer relationships is illustrated across intra-Fixed layer relationships and tree-internal relationships, focusing on an entity-centric relational network as it would be in the Fixed layer. This document-centric network has direct relationships (FIG. 6, 1) to a vast number of metadata entities, which in turn has internal relationships (FIG. 6, 2) binding them together in a highly connected structure. The DocumentValue entity is part of the curated metadata in the document's initial relationship cluster, (FIG. 4, 3) as exported by the Relationship Exporter (FIG. 4, 2 and FIG. 1, 10b), while the connected entities are metadata entities of the Fixed layer. All the entities and relationships are stored in a transient and dynamic state in the Relational Network FIG. 7 Relationship properties and Term sets Example 27. The drawing (FIG. 7) illustrates an example of how the System generates relationships between entities in the Fixed layer (FIG. 5 and FIG. 1, 13), in this example a document, and entities in the initial relationship cluster (FIG. 4, 3) and how may be stored in the Relational Network. It also illustrates how the term sets and metadata of the Metadata Repository (FIG. 1, 14) may be used by the Fixed layer. In addition, the drawing illustrates how the relationships of the Relational Network (FIG. 1, 11) are generated, and how properties on relationships are used in the Relational Network. The document entity (FIG. 7, 1) with the curated metadata (FIG. 7, 2), and Text tags (FIG. 7, 3 and FIG. 1, 8d) that form the initial relationship cluster, are exported by the Relationship Exporter (FIG. 4, 2 and FIG. 1, 10b). Based on functionality in the Relational Network and the Relationship Exporter, relationships are generated between the initial relationship cluster and the Fixed layer. The relationships (FIG. 7, 4) have properties that could include, but not be limited to: relationship type (relA), term in metadata that triggered the relationship (term_z), which level of a taxonomy or hierarchy in the Fixed layer the relationship is to (FLT/S no), the score of the relationship (+2), and the term of the Fixed layer that the relationship goes to. Each Fixed layer instance may have a wide array of terms in addition to the main instance name (NODE NAME). These terms are ordered in term sets (TERMSET), where one main identifier may be if the terms in the term set are ambiguous (A) or unambiguous (UA). In this example, unambiguous terms will have an initial higher score than ambiguous terms. At the same time, the drawing shows how scores for metadata of the document (FIG. 7, 2) have higher scores than text tags (FIG. 7, 3). The combined score of the metadata of the initial relationship cluster and the terms of the Fixed layer is reported as the relationship score (+2 as shown in FIG. 7, 4).

Figure 8:
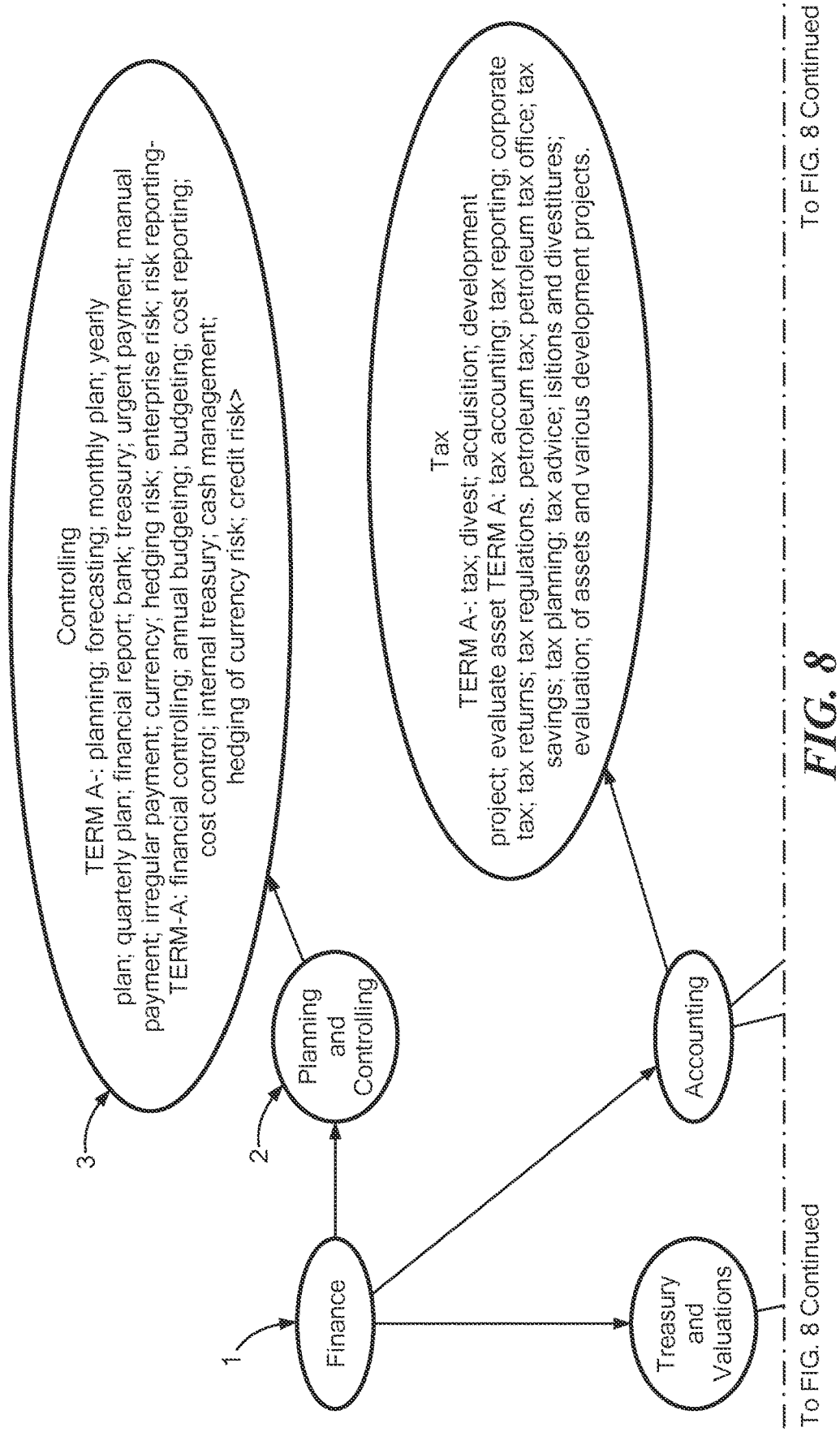
Figure 8:
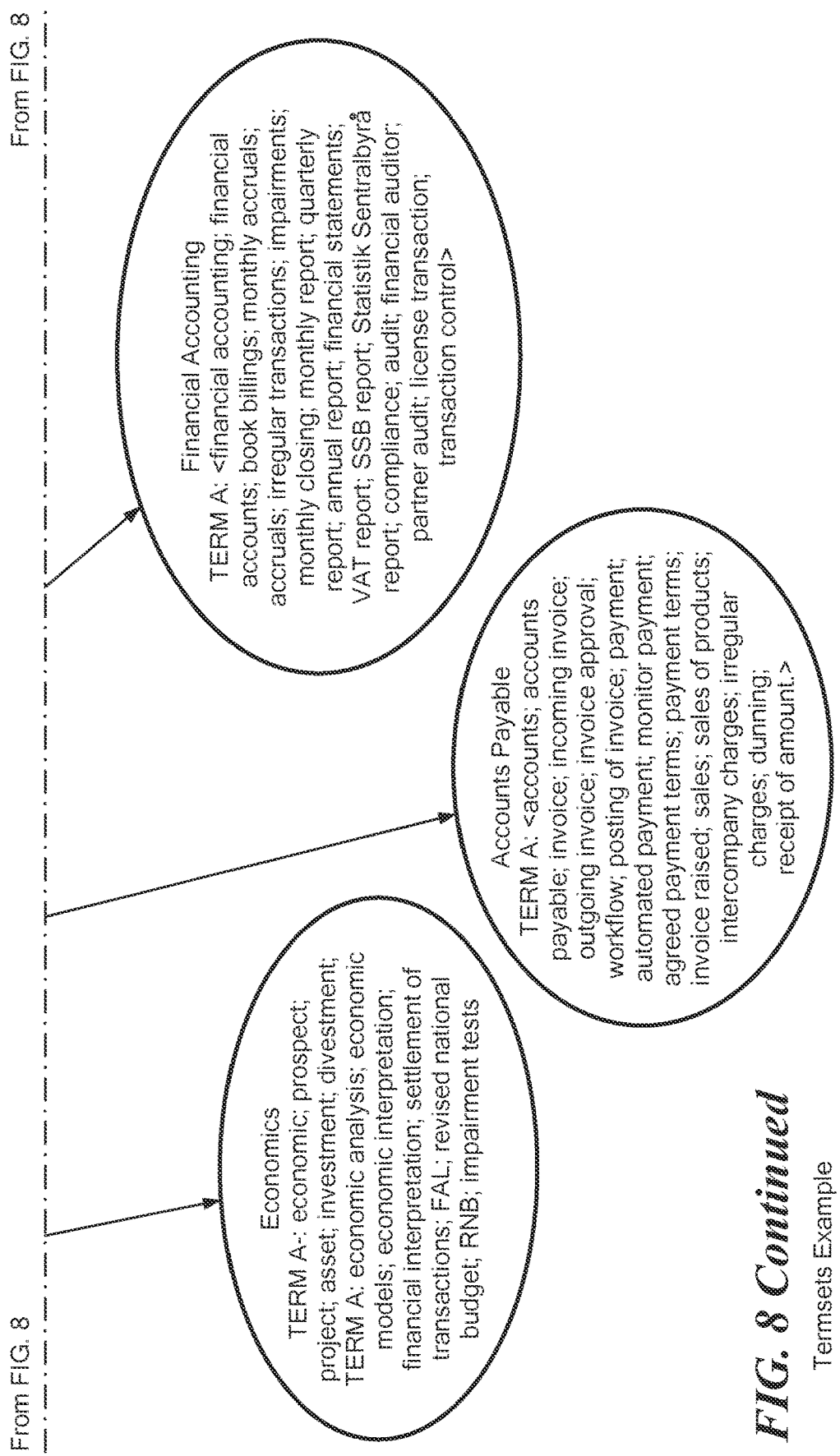

FIG. 8, FIG. 8 Cont. Term sets example

The drawing shows an example of how a term set from the Metadata Repository may be utilized by the Fixed layer to generate relationships. In this example, Finance as an activity is displayed as a simple taxonomy (FIG. 8, 8 cont., 1). In this taxonomy, Planning and Controlling (FIG. 8, 8 cont., 2) is a sub-activity and thus a branch or child of the Fixed layer structure. In this simplified taxonomy, the term sets for Controlling as the leaf entity is displayed. The term sets of the sub-activities Planning and Controlling, Accounting and Treasury and Valuations are aggregated of the term sets of the respective subactivity's term sets on leaves or branches connected. The aggregated term set for Finances as activity area will ultimately be all terms for activities and/or sub-activities related to the area.

DETAILED DESCRIPTION

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

28. The System resides on a network computer, and connects to one or more network computers with one or more data repositories in the form of a file repository, a record database or an application database, and makes data available to the end users via network computers or mobile devices via LAN or WLAN, as illustrated in FIG. 2. File repositories may be in the form of file servers, document management systems, collaboration solutions or web based document repositories. File repositories may be located physically on the premises, or in the cloud, or off site in other forms. Databases may be standard solutions such as mail servers, intranets, accounting solutions or other. It may also be specialized applications with information that usually is only available to a limited group of users. The Connector (FIG. 1, 3) may be configured to connect to any source, or repository, or application, or database containing structured or unstructured data information with structured or unstructured metadata.

29. The Connector (3) connects the System to the sources it is configured for and makes metadata for files, records and documents available to the system. All raw metadata is extracted by the Metadata Extractor (FIG. 1, 4). Raw metadata is extracted from both the source application and the file, record or document. The raw metadata is then stored in the Persistent Metadata Store (FIG. 1, 8) in the form of a structured relational database. In FIG. 3, this is illustrated in Block 13, by an example from a file repository (Block 1), where all metadata has been extracted by the Metadata Extractor (FIG. 1, 4). This is a view such as it may be presented in its simplest form in the Metadata Analytics module (FIG. 1, 8f). This also illustrates the mass of raw metadata that may be available. The Metadata Analytics module also enables simple analysis of similarities or differences between metadata of the same class or type, thus enabling both the user or system admin and the System to select metadata that has the highest potential for being useful to the System, and/or has the highest quality, trustworthiness and/or structure/syntax. In the Persistent Metadata Store (8), the Data extractor (FIG. 1, 5) also deposits data from files, records or documents, thus converting text to data available for the system. This is stored in the Data cache (FIG. 1, 8c).

30. Data from the Data cache (FIG. 1, 8c) and metadata from both the File metadata (FIG. 1, 8b) and Source metadata (FIG. 1, 8a) are used by the Text tag generator (FIG. 1, 9 and FIG. 3) as raw data. The Text tags (FIG. 1, 8d) added by the Text tag generator are added as tags to the raw metadata and used by the System alongside the metadata from the Sources (FIG. 1, 1). Text Tags may be single terms, stemmed terms or combinations of terms. The Text tag generator adds this system generated, engineered subject matter identifying metadata. The Systems intelligence separates the Text Tags from the authentic metadata from the Sources, and will never mistakenly identify Text Tags as true metadata. The Data cache is also used to produce an extract of the text to give some sense of subject matter to the end user. The extract may be the first passages of the original file, record or document, or an intelligently made summary produced by the System.

The Text tag generator analyzes the data and generates Text Tags based on a several different standard machine learning methods or algorithms, including, but not limited to:

31.1. Method 1: Term Frequency—Inverse Document Frequency (Tf-IDF). Term Frequency is the simple frequency for a given word in a file, document or record. Inverse Document Frequency is a standard logarithmic calculation of how much information a word provides. It is the scaled inverse fraction of the files, records or documents that contain the word. The combination of the two gives a weighted term list per document that is aligned with the total frequency of terms across the corpus of words for all documents in the repository. The Text tag generator calculates a given number of Text tags for each document by this method as a standard. The Text tag generator incorporates the technique of stemming and un-stemming terms in this method, thus making the method more effective than traditional Tf-IDF algorithms 31.2. Method 2: Assisted Learning. The Text tag generator is by this method presented with a learning set of data or metadata that represents a best practice or a cluster of terms that is common for a given context. The Text tag generator will then analyze and match terms in all files, records and documents and add any occurrence of these to the Text tags for a file, record or document.

31.3. Method 3: Clustering and labeling. The Text tag generator analyses documents based on commonalities, basic shared structures or inherent relationships and clusters these based on this. Based on a series of rule sets, including, but not limited to information from the Relational Network (FIG. 1, 11), the clusters are then labelled, and each file, record or document in the cluster inherits this/these cluster labels. The labels are then added as Text tags to the file, record or document and added to the Text Tags(FIG. 1, 8*d*).

31.4. Method 4: Natural Language Processing (NLP) included, but not limited to the use of Relationship Extraction, KingWife, Parsing, Topic Segmentation, Sentiment Analysis; each combined or alone in any given scenario; to deduce subject matter, meaning and extract meaningful and/or meaning bearing terms from the data. By this method, especially when combined with Method 1-3 mentioned in this document, the System can analyze and make available subject matter and meaning of data on an extremely granular level.

31.5. Method 5: Assisted Learning using the Relational Network as learning set. By this method, the Text tag generator may learn from the existing intelligence in the system, as materialized in the Relational Network. Based on this, the Text tag generator may infer, deduce, calculate and/or learn what the System has been taught or configured to do based on metadata only, and apply this learning on the data extracted from the files, records or documents. This will intern result in more intelligent Text tags or analysis reports that may be used to improve the Relational Network further. The Text tags produced by Method 5, will also be added as Text tags to the system.

31. File Images are generated by the File image generator (FIG. 1, 7) and stored in the Thumbnails (FIG. 1, 8*e*). File images are graphic representations of the file, record or document in their original form. These are most useful for the end user when analyzing a list of documents, to give graphical clues as to which documents are most relevant for the current situation or search. In the case of graphical files, these may also be used by the System in other manners, including, but not limited to image recognition.

32. The IntOp Mapper (FIG. 1, 10) is an intelligent function that has an extensive array of functions, and is on its own responsible for generating the core intelligence of the system from the given raw metadata. The two main categories of functionality are the Metadata curation (FIG. 1, 10*a*) and the Relationship Exporter (FIG. 1, 10*b*).

33. Metadata curation is a series of intelligent functions and rules that in general takes the raw metadata as presented in the Persistent Metadata Store (FIG. 1, 8) and refines and improves it for further use in the system. The functions in the Metadata curation module includes, but are not limited to:

34.1. Select and discard. Based on automatic functions, rules and/or analysis in the Metadata Analytics module (FIG. 1, 8*f*), the Metadata curation module selects metadata based on criteria including but not limited to quality, structure, syntax, usefulness, trustworthiness, subject matter content, meaning and others. In addition, the select/discard function will identify and select or discard metadata including but not limited to the source, owner, creator, editor, dates (including, but not limited to create date, last saved date, last printed date), storage location, metadata about the source, all according to given rules for each metadata class related to the specific source. Depending on the Source, any given class or instance of metadata or metadata value may meet one, several or none of the given criteria. Again, depending on the Source, certain metadata will always be selected due to other rules related to the specific source. These special criteria may completely outrank the generic criteria. FIG. 3 shows metadata select/discard 33.2. Unification, and normalizing. Metadata may be very heterogenic and the same class of metadata may have different syntax or structure depending on if it is stored as document metadata or source metadata, or depending on the specific sources it is found in. In the case of metadata about time and time series, the syntax of date and time may also vary depending on geography and language. In addition, language in general, both in terms of local language and in terms of spelling, may be unified and normalized in the Metadata curation module. A typical example would be to transform all dates to the same format. Unification and normalizing may include, but not be limited to normalized formatting, spell checking, stemming and/or un-stemming, join or separate metadata.

33.3. Parsing. Certain metadata types may be parsed for clarity and to discard and avoid noise from meaningless metadata. Parsing may also include, but not be limited to the extraction of terms indicating subject matter, meaning or context, splitting of concatenated terms, separation of terms, stop word removal and transformation of text strings to separate metadata instances. A typical example may be to extract meaningful terms from the title of a text document and use these as metadata.

33.4. Improvement. The Curation Module may also improve metadata based on several requirements, including but not limited to; need for quality improvement, need for more clarity, subject matter expert input, inherent metadata (i.e. All records from a finance repository receiving a Finance label that would have been superfluous in the source).

34. The Relationship Exporter Module (FIG. 4) includes functionality that exports the curated metadata for a file, record or document as a relational network cluster and thereafter generates several types of complex, multidimensional, linear and non-linear relationships with a wide array of properties, between the curated metadata cluster and the metadata of the Fixed layer (FIG. 1, 13). Based on input from the Teaching Module (FIG. 1, 15) the Relationship Module will export an initial cluster to the Relational Network (FIG. 1, 11), create relationships to one or several metadata objects in the Fixed layer, thus creating clusters of classifying metadata around the exported curated metadata cluster. In addition, a calculated score is given to each of the metadata instances of the exported initial cluster. This score signifies the quality, trustworthiness and usefulness of each metadata instance. In addition, it signifies whether the metadata is ambiguous or unambiguous and thus giving the System a basis on which to classify the file, record or document within a certain context based on this alone or in combination with other metadata instances for the file, record or document. This is done first for all files, records or documents from a repository and then a recurring process starts where the initial relational cluster, consisting of the curated metadata cluster and the relationships to Fixed Layer metadata, is continuously improved via the intelligent processes as described below. The Relationship Module also exports all Text tags added by the Text tag generator as part of the initial cluster, labeled as Text tags with metadata including, but not limited to classification of type, calculated score, calculated rank, indications of ambiguity or unambiguity, and/or synonyms.

35. The Relational Network (FIG. 6) is a neural-like network that contains all the logic and relationships of the System. In the Relational Network, all exported clusters containing curated metadata for files, records and documents are connected to the pre-existing relational network of the Fixed layer (FIG. 1, 13 and FIG. 6,) with one or several relationships, each with varying types and numbers of properties. The relationships will be multi-faceted, multidimensional, non-linear or linear and contain a multitude of possible connections both to metadata of the Fixed layer and between exported clusters of metadata for files, records and documents. In the Relational Network, all files, records and documents will be connected to each other though the complex relationships to the Fixed layer. In addition, there may be relationships between exported clusters independently from the relationships to the Fixed layer. The relationships to the Fixed layer classifies and clusters the exported clusters into larger clusters with the same relationships to the Fixed layer metadata. The files, records and documents are thus aligned and placed in contexts that are intended to be intuitive, efficient and recognizable for the user groups. The high-level function of the Relational Network enables the navigation of the files, records and documents from the Sources in a common, homogenous metadata layer represented by the navigation structures of the Front Ends (FIG. 1, 21). The relationships themselves are at the core of the System, and contains properties including, but not limited to, metadata classification of the relationship in question, metadata about which terms in the Fixed layer and the exported clusters respectively that triggered the relationship, what type of metadata level the Fixed layer metadata instance is, the calculated weight of the relationship, the time the relationship was formed and what rule triggered the relationship. Any single metadata instance in an exported cluster may have numerous relationships to one or several metadata instances in the Fixed layer. Based on the relationship properties and metadata the System will be able to calculate and ascertain which relationships have the highest weight and/or the highest probability of being correct, both individually and as indication of a context or sub-context. This web of relationships forms a hierarchy of possible contexts that initially are deemed as useful and correct by the System. Adjustments to this initial calculation may be received over time in the form of new Teaching Rules from the Teaching Module (FIG. 1, 15) and/or in the form of input of variables from the Learning Module (FIG. 1, 16). This may result in new relationships being triggered, new properties on relationships and/or changed weight of relationships. Thus, the Relational Network is constantly changing, growing, developing and improving while the number of accumulated relationships increase as well as their quality, relevance and probability. Most importantly, from the first available initial cluster, the end user will have an aligned, homogenized metadata structure for the file, record or document, whereby it is classified in one or several contexts, with varying numbers of relationships, which have varying types and number of properties, enabling navigation via filtering in the Front End.

36. The Analytics module (FIG. 1, 12) contains functionality that enables analysis of the Relational Network. Through this functionality, it is possible to analyze the Relational Network and make everything from high level trends to statistical anomalies visible. In the Analytics module, the Relational Network may be viewed with all relationships, or statistics about the network and all possible variables may be viewed in the form of numbers of graphical representations.

Through the Analytics module, the connectedness of a certain type of metadata, file or source may be juxtaposed to the average connectedness of the same. Statistical maximum, minimum and average numbers for any type of variable in the network is available. In a special analytics function, the "health" of any part of or the entire network may be analyzed to ascertain how the intelligence of the system is handling changes, new sources, new types of files, records or documents, improved teaching rules and/or input from Learning Modules Data from the Analytics module may be made available to other third party analytics tools.

37. Fixed layer. The Fixed layer (FIG. 5 and V-a) consists of pre-defined metadata structures for any type of exported cluster metadata. The metadata are both traditional, generic metadata such as organization, location, time, file type and/or person classifiers such as editor, owner, author, and classifying metadata for the specific industry in question and/or classifying metadata for the specific organization in questions. Metadata in the Fixed layer contains best practice master metadata classes, sub-classes and values, and is a stabile structure that enables the homogenization, alignment and mapping of the heterogenic metadata from the sources, as represented in the Relational Network by the exported clusters. The Fixed layer is a relatively stable and independent multifaceted, interconnected relational network that follows other rules than those of the full Relational Network. A function of the Fixed layer is that it replaces the intricate, unmanageable and academically stringent linear logic of taxonomies and ontologies. It still solves the best practice-based functionality of an ontology and/or taxonomy, but adds the multifaceted, multi relational and non-linear aspects of a relational network. Thus, the previously limited and linear hierarchy of a taxonomy is supplied with non-linear, socalled intra-Fixed layer relationships, connecting the parts of, or the entire taxonomy to other metadata instances of the Fixed layer, that may on their own be part of another taxonomy or ontology. The Fixed layer also acts as an interpretive layer that submits almost immediately the result of what would otherwise have been a lengthy machine learning-based process. Some aspect of the Fixed layer also replaces indexing and semantics with the complex patterns of relationships that are formed, both incoming from the initial clusters and intra-Fixed layer relationships. The Fixed layer enables most of the relationships in the Relational Network to be made, and its main function it to work as a connection hub for all the relationships from the initial clusters. All metadata instances in the Fixed layer has a calculated score that indicates the uniqueness, usefulness, quality and unambiguousness of the metadata instance, thus further enabling the weighting of any relationship to this metadata and by this the probability of connectivity to one or more assembled contexts based on the availability of relationships to the Fixed layer metadata instances. Sources for metadata used in the Fixed layer may include, but not be limited to: organizational diagrams, process diagrams, management systems, enterprise master metadata, source metadata, geographical metadata, discipline metadata, taxonomies, ontologies, open data sources, curated input from subject matter experts and/or the System itself.

38. The Metadata Repository (FIG. 1, 14) consists of a multitude of term sets, dictionaries or vocabularies that are used by the Fixed layer to add context and subject matter via the relationships. Most operative metadata instances of the Fixed layer will use one or more term sets from the Metadata Repository to generate meaningful, useful, more numerous, rich and precise relationships to initial clusters. The Metadata Repository terms are classified based on criteria including, but not limited to ambiguity or unambiguity, usefulness, and preciseness. As an example, a small collection of terms may be enough to clearly define the context of a metadata instance that describes an activity. These terms are classified as unambiguous to that specific metadata instance, thus enabling any relationship to this metadata instance from an exported initial cluster to clearly classify the context of said cluster. Other term sets may act as subject matter or sub-context identifiers within a larger context, and such will be much more ambiguous related to the larger context, but very precise and unambiguous related to said subject matter or sub-context. Based on the combined logic and intelligence of the Metadata Repository, Teaching Module, Fixed layer, Text tag generator and Learning Module, at any given point in time for any given relationship, there may be thousands of terms used as the basis of hundreds of relationships. The sources of the term sets may include, but not be limited to; curated terms from subject matter experts, user groups, open data sources, industry specific standards, discipline specific standards, ISO standards, ontologies, taxonomies, dictionaries, vocabularies and/or the System itself.

39. The Teaching Module (FIG. 1, 15) is the main function for a system administrator, subject matter expert, developer or information management professional to teach the System how to treat any given type of metadata. The Teaching Module contains what might be viewed as configurations or rules for use in the Relationship Module, the Learning Module and the Fixed layer. Most of the relationships in the Relational Network are aggregated or triggered based on teaching rules in the Teaching Module. Because the intelligence of the system has more complex functionality than traditional business rule engines or business intelligence type solutions, the Teaching Rules for any given context or subcontext may influence the entire logic of the Relational Network based on the secondary, subsequent or ensuing changes the rules generates. Each rule may contain elements that the System adopts for the entire Relational Network, giving it a greater effect and a synergistic approach that will have a "teaching" effect, as opposed to a hard configuration that only does what was intended to do, no more no less.

40. The Learning Module (FIG. 1, 16) is a set of logic and analytics functions that consumes log data and other statistics from the various front ends, input from the Teaching Module and the Relational Network to assist in a near autonomous learning process to continuously improve the quality, number of relationships, preciseness of relationships, weighting of relationships, quality of metadata and terms of the Relational Network. The methods employed by the Learning Module may include, but are not limited to: 41.1. Log data for weighting. As a main function, the Learning Module will continuously analyze anonymous user activity logs, both individual logs, logs based on user groups and the entire user group, and influence the weighting of the files, records and documents that most often see interaction with user(s). Interaction may be that a specific file, record or document is often part of a result from filtering, is clicked, previewed, downloaded or shared often, or is trending in other ways in logs. The file, record or document will then be weighted higher than other files in the same cluster, as user interaction shows that it is more useful, interesting or focused than the others. Based on the methods described in the Relationship Module and Relational Network, files, records or documents that have most connections will be weighted higher than those with fewer connections. This will be confirmed or adjusted by the learning module, thus giving a method by which the users themselves may correct and improve the System through their use of it.

40.2. Log data for metadata and term improvement. The Learning Module may use the terms in metadata and Text tags from documents that trend in the statistics to further improve these metadata and Text tags for all files, records or documents where they are present. In addition, searches for Text tags logged from the Front End may be used to influence the score of each individual Text tag based on how often it appears in logs. Furthermore, searches for Text tags that does not exist in the System at the time of the search, may trigger the Teaching Module to implement Teaching Rules for these terms based on threshold values, i.e. if a specific term appears in searched more than x times, it will automatically trigger a Teaching Rule to be implemented. This would again generate new relationships in the Relational Network. In addition, the Text tag generator would get instructions to find these terms in the Data cache and generate Text tags with a nominal score for them, regardless of the rank of that term. Last, but not least, Text tags that does exist, and are continuously used by users in filtering, or are used as one of a limited set of filters often, may be promoted to filters in the context where it is most often used. This would make the context filter more efficient, and use input from users to improve the front ends.

40.3. Log data for relevance. Log data would be used to build a relevance score for any given filtering. In at least one of the setups for presenting data from the System, relevance would be the main filtering criteria. Relevance would initially be based on the weight of each file, record or document, and be sorted descending based on this. In addition, a relevance score would be added to this sorting for any file, record or document that is not at the very top, if it is interacted with instead of the top-ranking file, record or document. This is an additional method of weighting than log data for weighting, as it only influences the criteria of relevance, and how it is sorted.

41. The Persistent Relationship Store (FIG. 1, 17) is the product of the System at any given time, as exported for the specific user group or customer in question, and a persistent layer that gives the end users a stabile repository of information to interact with. The System processes before the Persistent Relationship Store are all continuously in change or evolution, and as such not stabile or static enough for the wider user groups. The Persistent Relationship Store selects which parts of the Relational Network will be made available for each specific configuration. The Persistent Relationship Store makes available several types of information, including, but not limited to: 42.1. Relationships (FIG. 1, 17a). The selected relationships from the Relational Network are available to the end users. While selecting relationships to include, there may be both an automated rule based function and a manual configuration of relationships to include or exclude. The relationships make available all possible context that an information object may be part of. Like in the Relational Network, any given information object may be part of several contexts, but with varying numbers of relationships identifying these contexts.

41.2. Context (FIG. 1, 17b). Contexts are derived from the relationships, and as such are not separate data in the Relationship Store. Still, they are there and available for the users to navigate as identifiers of groups of information.

41.3. User and access (FIG. 1, 17c). Login ID and password to the Solution is stored in the Persistent Relationship Layer, granting access to all or a selection of the relationships, including but not limited to all or a selection of sources, document types, file types, date ranges and other criteria inherited from the Source. As part of the Single Sign On procedure of the System, the Relationship Store aligns what is viewable for a user with what the user has access to in the Source originally.

41.4. Keywords (FIG. 1, 17d). Keywords are made available for the Keyword Lookup function in the Front End. Keywords are terms may be made available from several functions, including, but not limited to text tags, log data, full text, fit for purpose indexes, metadata and term sets.

42. Dispatch Module. The Dispatch Module makes all data in the Persistent Relationship Store available in the form of XML or JSON. This makes data in the System available to virtually any front end or third-party application in a standardized form.

43. Logging Module. The logging module logs user behavior in the front ends and collects user statistics, KPI's and raw logs for the Learning Module. The log data may include, but not be limited to, the types of data mentioned in 41.1-3 above. The Logging Module serves data to the Learning Module and to fit for purpose functions in the System. The main function of the Logging Module is to gather data about the use of the System to further improve the usability and quality for the users.

44. Search Module. The Search Module serves search functionality to the Keyword Lookup function in the Front End. Searches are not traditional full text searches as standard, and includes, but are not limited to: search of Text tags, title of objects, unindexed text of results, 45. Front End. The Front End could be the fit for purpose Front End for the System or any other system that can receive the XML or JSON objects from the Dispatch Module. Central to the logic of any front end, is the generation, presentation and use of contexts with filters to navigate information. These are either generic across customer types and industries, or especially made for an industry, a customer or a specific user group. These are again based on the relationships and contexts in the Relational Network (FIG. 1, 11). The Front End may in at least one of its configurations be an interactive application presented to the user through a web browser, in a third-party application and/or as a dedicated stand-alone application. A user will get access only to data information that the user already has access to in the Source. This is a function of the Connector (FIG. 1, 3). The Front End relies on the Persistent Relationship Store (FIG. 1, 17) and generates contexts and filters based on the information available there, via the Dispatch Module (FIG. 1, 18).

INDEX

Figure 1A:
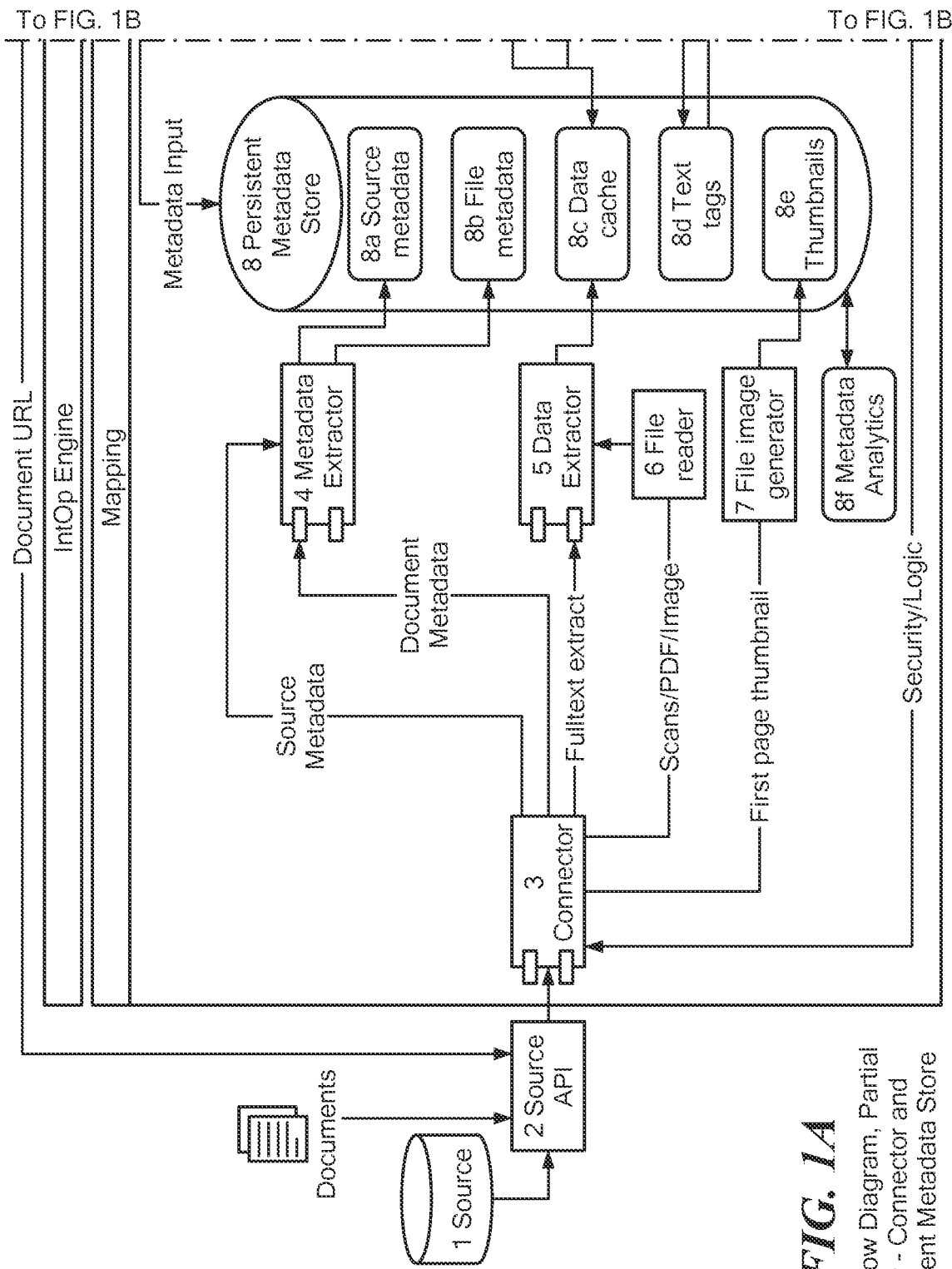
Figure 1B:
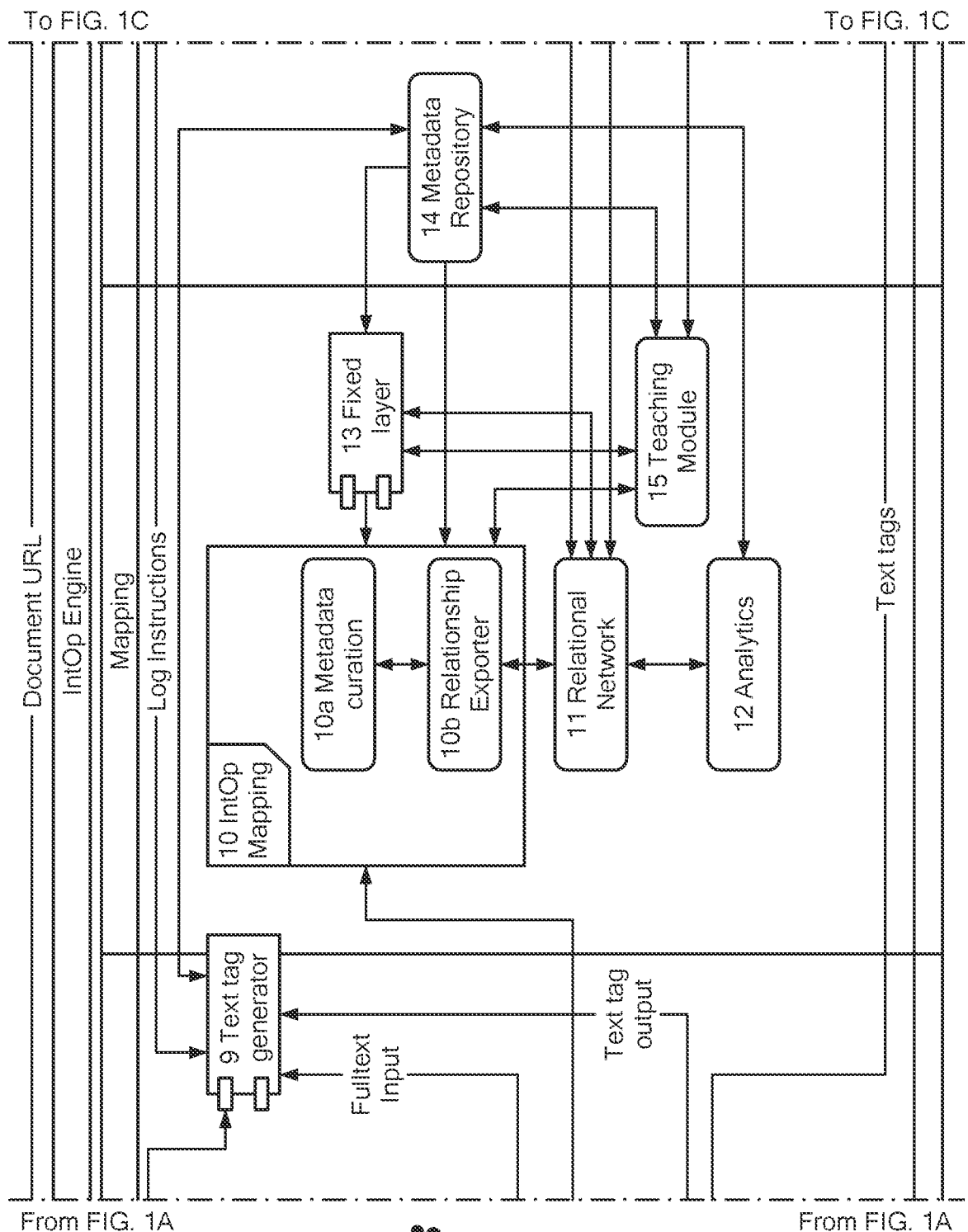
Figure 1C:
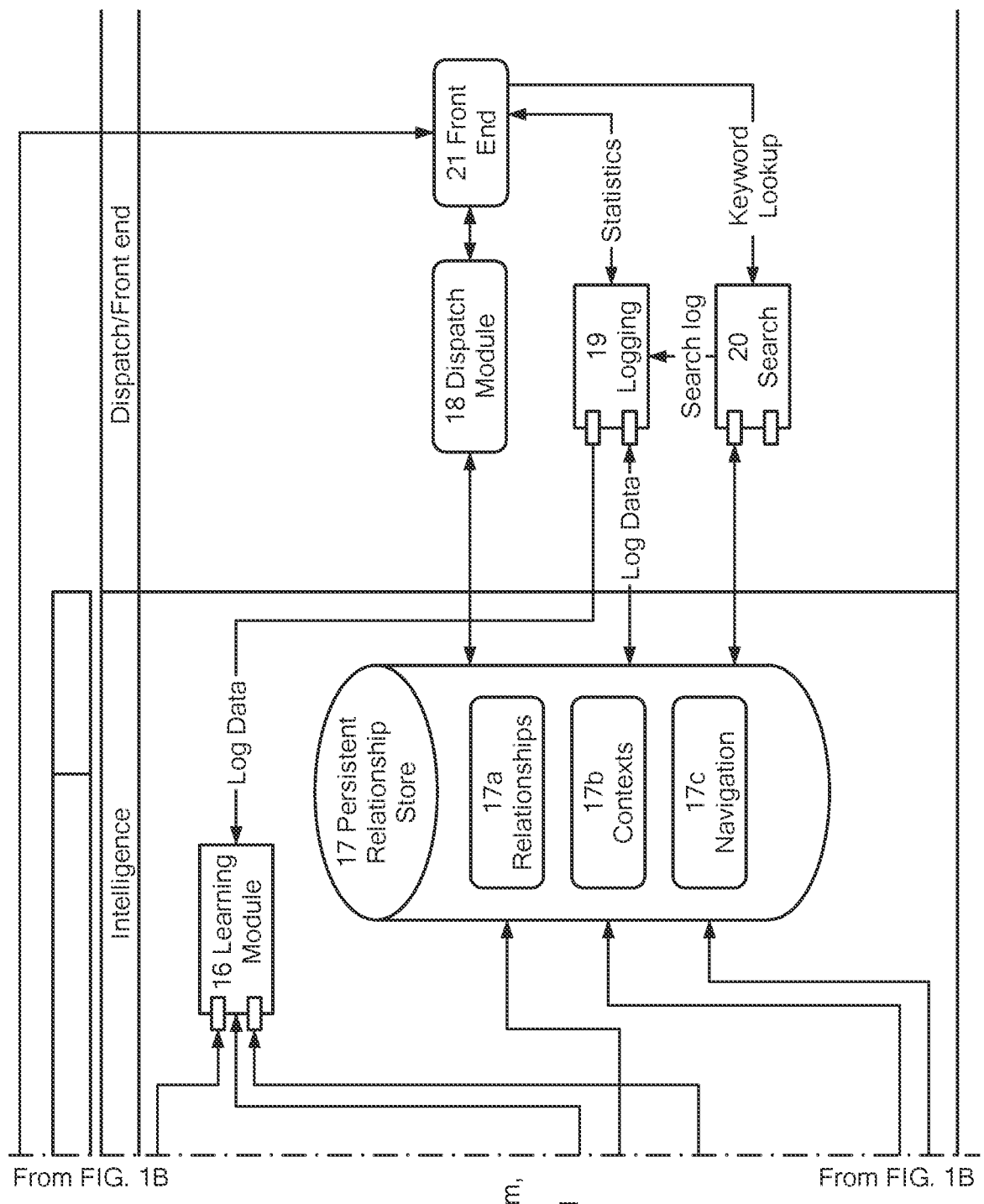

FIG. 1—Main flow diagram, complete view . . . 2
FIG. 1a—Main flow diagram, partial view—Connector and Persistent Metadata Store . . . 3
FIG. 1b—Main Flow Diagram, Partial View—Mapper and Relational Network . . . 4
FIG. 1c—Main Flow Diagram, Partial view, Intelligence and Front End . . . 5
FIG. 2—Network Diagram . . . 6
FIG. 3—Curator . . . 7
FIG. 4—Relationship Exporter . . . 8
FIG. 5—Fixed layer example . . . 9
FIG. 5a—Fixed Layer Example, Partial view . . . 10
FIG. 6—Relational Network internal relationships, Document example . . . 11
FIG. 7 Relationships and Termsets Example . . . 12
FIG. 8, 8. Cont. Termsets Example . . . 13

What is claimed is:

1. A system for managing, analyzing, navigating or searching of data information across one or more sources within a computer network, the system being configured for aligning and connecting unstructured, heterogenic metadata describing data information extracted from the one or more sources in order to provide a homogenous structure of metadata describing the data information, thereby enabling access to the data information in a contextual manner, the system comprising:
  a fixed layer network of metadata entities, entity types, entity relations and entity relation types defining internal multiple non-linear relationships between the metadata entities;
  a mapper configured to select and structure the metadata describing the data information extracted from the one or more sources, the mapper comprising:
  a metadata curation module configured to process the metadata extracted from the one or more sources according to a set of rules and criteria; and
  a relationship exported module configured to create one or more initial relational network clusters, in which the metadata is represented as separate entities with relationships to a file entity, based on the processed metadata from the metadata curation module, the relationship exporter module is further configured to export the initial metadata cluster to the relational network of the fixed layer and further configured to calculate a score for each metadata instance, the scoring signifying the quality, trustworthiness and usefulness of each metadata instance;
  the mapper being further configured to parse and map the one or more relational network clusters created by the relationship exporter module to the relational structure of the fixed layer network, thereby creating a relational network with relationships between the metadata describing the data information and the metadata entities of the fixed layer network, all metadata instances of the fixed layer having a calculated score, a combined score of the metadata of the initial cluster and the fixed layer is determined and provided as a property for the relationship;
  at least one of a weight and probability of being correct is determined for relationships based on the relationship properties and the metadata for increasing accuracy of navigation of the data information.

2. The system according to claim 1, wherein the respective relationships between the metadata describing the data information and the metadata entities of the fixed layer network further have properties corresponding to relationship type, terms, weight and probability and to what type of fixed layer entity it is connected.

3. The system according to claim 1, wherein the internal relationships between the metadata entities includes metadata classes, subclasses and identifiers.

4. The system according to claim 1, wherein the set of criteria includes trustworthiness, time, quality and usefulness.

5. The system according to claim 1, wherein the metadata curation module is further configured to one of add, remove, parse and combine metadata to provide a more effective metadata structure.

6. The system according to claim 1, wherein internal relationships are at least one of organizational, legal, structural, geographical and time relationships.

7. The system according to claim 1, wherein the data information is at least one of files and documents and the one or more sources are one or more databases.

* * * * *